(12) United States Patent
Sawada

(10) Patent No.: US 6,315,893 B1
(45) Date of Patent: Nov. 13, 2001

(54) GAS/LIQUID MIXER WITH DEGASIFIER

(76) Inventor: Yoshiyuki Sawada, 28-2, Oaza Atumogo, Toyouracho, Toyoura-gun, Yamaguchi 759-63 (JP)

( * ) Notice: Subject to any disclaimer, the term of this patent is extended or adjusted under 35 U.S.C. 154(b) by 0 days.

(21) Appl. No.: 09/555,416

(22) PCT Filed: Dec. 25, 1997

(86) PCT No.: PCT/JP97/04862

§ 371 Date: May 30, 2000

§ 102(e) Date: May 30, 2000

(87) PCT Pub. No.: WO99/33552

PCT Pub. Date: Jul. 8, 1999

(51) Int. Cl.[7] .................................................. B01D 19/00
(52) U.S. Cl. .............................. 210/86; 210/97; 210/120; 210/188; 210/218; 210/916; 96/157; 96/181
(58) Field of Search ................................ 210/86, 97, 194, 210/197, 188–209, 218, 220, 221.1, 221.2, 916, 703, 750, 718, 120; 426/477; 422/231, 234; 261/119.1, 115; 96/157, 165, 159, 181, 219; 95/156, 166, 244, 245, 319, 408, 417, 8

(56) References Cited

U.S. PATENT DOCUMENTS 3,679,053 * 7/1972 Koulovatos et al. .
4,062,770 * 12/1977 Kneer .
4,652,382 * 3/1987 Edwards et al. .

FOREIGN PATENT DOCUMENTS

| 0 481 384 A2 | * 4/1992 | (EP) . |
|---|---|---|
| 51-6352 | 1/1976 | (JP) . |
| 54-75156 | 6/1979 | (JP) . |
| 56-56220 | 5/1981 | (JP) . |
| 60-68037 | 4/1985 | (JP) . |
| 61-54226 | 3/1986 | (JP) . |
| 5-317847 | 12/1993 | (JP) . |
| 8-112587 | 5/1996 | (JP) . |
| 8-132094 | 5/1996 | (JP) . |

* cited by examiner

Primary Examiner—Joseph W. Drodge
Assistant Examiner—Terry K. Cecil
(74) Attorney, Agent, or Firm—Jordan and Hamburg LLP

(57) ABSTRACT

A polluted water purification apparatus includes a pump 2 and nozzles 4 for delivering polluted water from a polluted water region to a pressure tank T; a gas supplying device 9, 10 for supplying a gas, e.g. oxygen, to the pressure tank; a water level controlling device 5, 6; a degasifier (e.g. 15); and a discharging device 13 for returning the polluted water to the polluted water region. The degasifier periodically discharges gas from the pressure tank in order to prevent toxic gaseous substances (e.g. ammonia) which accumulate in an upper portion of the pressure tank from re-polluting the water therein whenever a concentration of gas in the pressure tank reaches or exceeds a predetermined level.

7 Claims, 4 Drawing Sheets

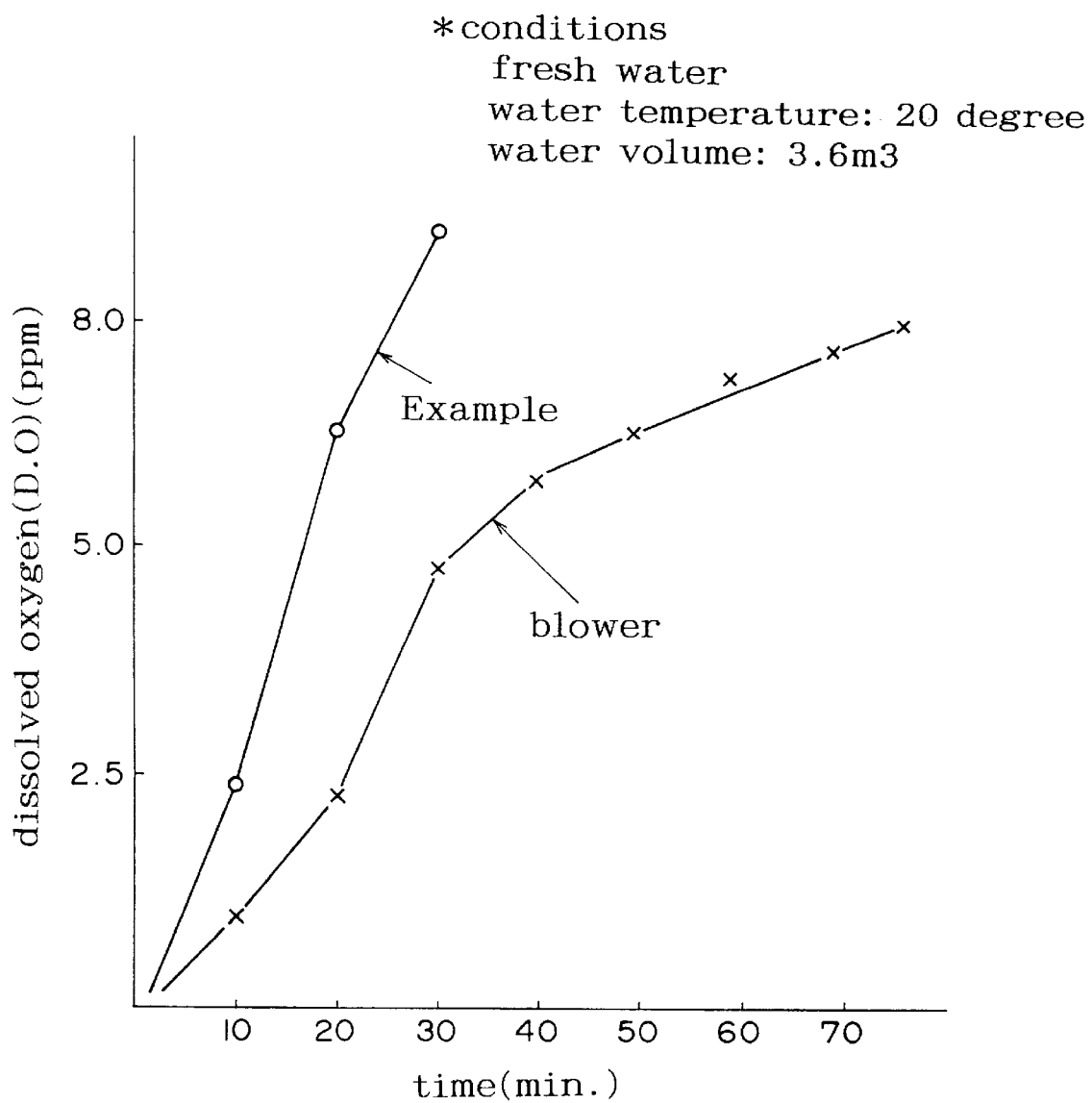

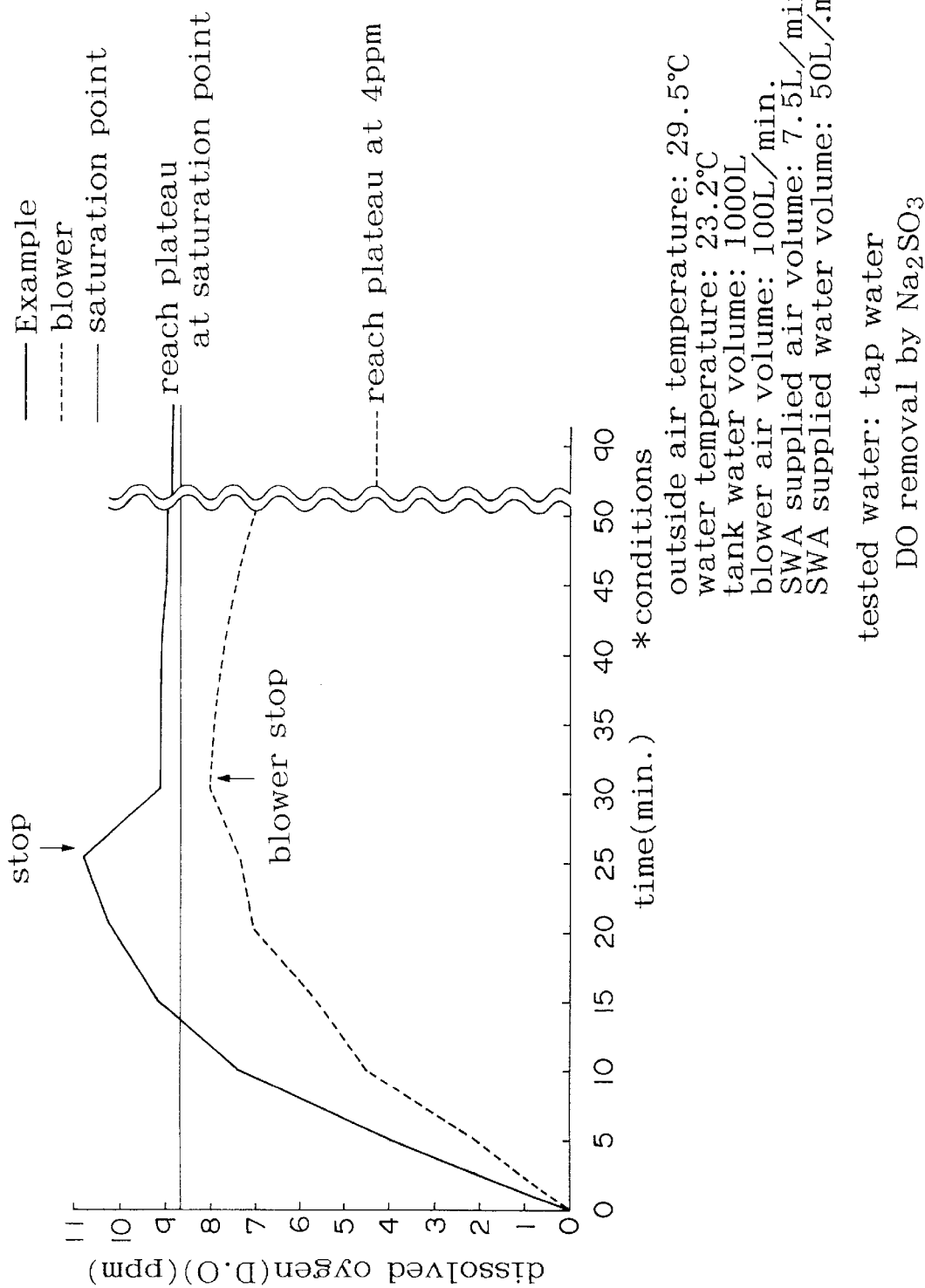

GAS/LIQUID MIXER WITH DEGASIFIER

TECHNICAL FIELD

The present invention relates to a vapor/liquid mixer which mixes gas such as air with a liquid such as polluted water. Specifically, the present invention relates to a vapor/liquid mixer for use, for example, in a pressure floatation method comprising the steps of dissolving gas such as oxygen in polluted water to make pollutants rise, and to a polluted water purification apparatus using the mixer.

BACKGROUND ART

As water pollution generated as a by-product with recent technological advances is becoming worse and worse with improvement in the standard of living, a variety of purification processes for water quality have been developed.

Of these purification processes, a so-called pressure floatation method is employed as a purification process of, especially, closed water regions such as lakes and sea areas. The pressure flotation method is a purification process which comprises the steps of ejecting pressurized water saturated with air dissolved therein from nozzles or slits, allowing fine air bubbles formed by a sharp drop of the pressure to adhere to floating or depositing solids, thereby making the solids rise to form scum, and collecting the formed scum.

Purification techniques using the pressure floatation method are disclosed in, for example, Japanese Unexamined Patent Publication No. 54-75156, Japanese Unexamined Patent Publication No. 5-317847, Japanese Unexamined Patent Publication No. 8112587, and Japanese Unexamined Patent Publication No. 8-132094.

The Japanese Unexamined Patent Publication No. 54-75156 discloses a benthic region purification process. The process includes the steps of dissolving air in water to be saturated under pressures higher than the water pressure of a benthic region to yield pressurized water, ejecting the pressurized water from nozzles placed in the benthic region to form fine air bubbles, mechanically stirring deposits in the benthic region concurrently with the ejecting operation to rise the deposits, allowing the floating matters to adhere to the fine air bubbles, thereby allowing the floating matters to float onto the surface of the water, and collecting and removing scum of the deposits on the water.

The Japanese Unexamined Patent Publication No. 5-317847 discloses a water purifying device which is capable of forming very fine air bubbles by attaching a pressure valve at a tip of a supplying pipe in a region to be treated, and supplying a raw liquid pumped up by the pressurized pump concurrently with supplying compressed gas from a compressor to a vapor/liquid mixing means.

The Japanese Unexamined Patent Publication No. 8-112587 discloses an improvement of the water purifying device disclosed in the Japanese Unexamined Patent Publication No. 5-317847. In the device, both a tip of a pumping tube and a discharge valve at the tip of a discharge tube are placed in a liquid in a region to be treated, and a pump means is operated to supply the original liquid in the region to be treated to a vapor/liquid mixing means. By this configuration, gas supplied through a gas supplying means is mixed with the liquid to be treated to allow the gas to completely dissolve in the liquid.

The Japanese Unexamined Patent Publication No. 8-132094 discloses a fine bubble discharging apparatus. To increase the discharge of a liquid containing dissolved gas and to increase the content of fine air bubbles in the discharge, this apparatus includes a group of injection holes and an outer cylinder outside the injection holes. The outer cylinder has a discharge port which opens either at the end supplying the liquid containing dissolved gas or at the opposite end thereto, and the liquid containing dissolved gas injected from the injection holes is collided with the outer cylinder.

As described above, various improvements in purification apparatuses for use in a pressure floatation method have been made. What is the most important in the pressure floatation method is believed to maximize the volume of fine air bubbles dissolved in a solution. Generally, in the pressure floatation method, the more uniform and smaller particle sizes air bubbles have, the higher the absorbency is and the more quietly the bubbles rise. In addition, such air bubbles do not bubble in an upper layer, and adsorbed flocks and floating matter can be recovered without breaking.

However, to mix gas and a liquid, all of the above apparatuses are provided with a vapor/liquid mixer such as an ejector separate from a pressure pump to supply a vapor/liquid as a mixture of gas and a liquid to the pressure pump. Therefore, the apparatuses as a whole are complicated, and air bubbles to dissolve in the liquid have limited sizes because the gas is mechanically mixed with the liquid. The purification capacity of the apparatuses is thus limited.

Accordingly, an object of the present invention is to provide a vapor/liquid mixer which has a relatively simple structure and is capable of allowing fine air bubbles with a high purification capacity to dissolve in a liquid, and a polluted water purification apparatus using the mixer.

DISCLOSURE OF INVENTION

The present inventor has studied intensively to solve the above problem and found that a space into which a liquid, preferably in a form of a shower, is ejected provided in a pressure tank enables gas such as oxygen to efficiently dissolve in a liquid without requiring an ejector or other conventional vapor/liquid mixers. The ejected liquid comes in contact with air in the space formed over a liquid level of the pressure tank before the ejected liquid reaches a surface of a stored liquid, and the ejected liquid is crushed by colliding with the level of the stored liquid, thereby further enhancing the dissolution.

Specifically, the vapor/liquid mixer of the present invention comprises a pressure tank having an inlet and outlet for a liquid, a gas supplying means which supplies gas such as oxygen to the pressure tank, a liquid level control means which controls a liquid level in the pressure tank, and a liquid ejecting means which ejects a liquid onto the liquid level of the pressure tank. Theterm"gas" used in the vapor/liquid mixer of the present invention includes air, oxygen, carbon dioxide, nitrogen and other soluble gasses.

By the above configuration, a liquid ejected onto the liquid level allows the contacting area of gas with the liquid to increase and ensures the gas to dissolve in the liquid. In addition, the ejected liquid crushes into fine particles by colliding with the level of the stored liquid, thereby further enhancing the dissolution of the gas. When gas such as oxygen dissolved in a liquid is released into the air, the released gas has a significantly smaller particle size of about 5 μm compared with that obtained by conventional mechanical stirring. Such fine air bubbles have large contacting area with the liquid and exhibit a high aeration effect. Furthermore, it takes longer for fine bubbles to rise in the water, which further enhances the aeration effect.

The vapor/liquid mixer of the present invention can be widely used not only in a polluted water purification apparatus but also in a deodorizer, a degasifier and other apparatuses which mix gas with a liquid.

When the vapor/liquid mixer of the present invention is used as a deodorizer, the liquid collides with the liquid level as mentioned above and exhibits a so-called Lenard effect, that is, "when water violently collides with rock or the like in waterfalls or rapid rivers, large amounts of negative ions are formed, and clean air containing fine mists is generated." By this effect, gas enclosed in water molecules temporarily becomes inert and is released, thereby deodorizing the water.

Odor components in raw water, during the storage in the apparatus, make contact with fine air bubbles having a diameter of about 5 $\mu$m, i.e., fine air bubbles having a large surface area and are deodorized by the stripping activity of the air bubbles. In this process, such fine air bubbles remain longer in water than the air bubbles obtained by conventional aeration processes, and therefore have a longer stripping time. By this advantage, the deodorizer can have increased deodorizing efficiency than conventional equivalents.

Next, the application of the present invention to removal of ammonia or other components dissolved in water will be explained. Generally, polluted water contains dissolved ammonia or other gases which are more soluble than oxygen. To remove the ammonia, it is necessary to form spaces or gaps where oxygen is to be dissolved in the polluted water. According to the present invention, gas is dissolved in a liquid not by means of mechanical stirring but by collision with the liquid level as mentioned above. Thus, clusters of the liquid are crushed to form gaps to thereby enhance the dissolution of gas such as oxygen. By this configuration, the degasification is promoted.

As the liquid level control means for use in the present invention, a system which comprises a liquid level gauge to detect the liquid level in the pressure tank and a control unit to control an opening of a throttle valve arranged in a port of the pressure tank and/or to control a pressure of the supplied gas can be used.

The volume of a gas region formed above the liquid level of the pressure tank should preferably be 30% or more relative to the total capacity of the pressure tank in order to further enhance the dissolution of gas such as air in a liquid. If the gas region has a volume of less than 30% relative to the total capacity of the pressure tank, the amount of the gas dissolved in the liquid is decreased. The liquid ejected onto the liquid level of the pressure tank is preferably in a form of a shower or a mist. Further, by allowing a liquid stored in the pressure tank to form a vortex by the ejected liquid, air bubbles close to the water level enter inside the stored liquid to further enhance the dissolution of the gas.

As a gas supplying means, conventional compressors can be used. Gas to be supplied to the pressure tank may most generally be oxygen-containing air when the vapor/liquid mixer is used in a polluted water purification apparatus, but may be gas containing oxygen in a higher concentration to improve the purification capacity.

The polluted water purification apparatus of the present invention pumps up water in a polluted water region, dissolves gas such as oxygen in the water under pressure, and discharges the water into the polluted water region again. The apparatus comprises a pump which pumps up the polluted water from the polluted water region, a pressure tank in which the polluted water pumped up by the pump is stored, a gas supplying means which supplies gas such as oxygen to the pressure tank, a water level control means which controls the water level in the pressure tank, a polluted water ejector which ejects the polluted water pumped up onto the water level of the pressure tank, and a discharging means which discharges the water in the pressure tank into the polluted water region.

As a pump for pumping up polluted water, a slurry pump or a screw pump is preferably used because they also pump up sludge.

The discharging means for discharging the water in the pressure tank into the polluted water region may be composed of a piping such as pipes and hoses connected to the pressure tank, throttle valves placed in the piping, and nozzles arranged at a tip of the piping. Conventional nozzles can be used as such nozzles, and the liquid may also be discharged directly from the piping into the polluted water region.

Preferably, the apparatus of the present invention further comprises a degasifier which degasses the pressure tank to remove gas and a deodorizer which deodorizes the removed gas. If gas remains in the pressure tank without degassing, the gas dissolves again in water in the pressure tank, thereby re-polluting the water. Thus, the purification capacity declines. Since the removed gas often contains toxic substances such as ammonia, the deodorizer is provided for purifying the gas. The deodorizer is preferably an ozone deodorizer or a deodorizer using phytoncid in particular.

When the purification apparatus of the present invention is used as a pretreatment apparatus for a rapid filter or an active carbon filter, BOD and nitride components can be efficiently removed. Specifically, the water improved in the DO value in the purification apparatus is made to flow through a rapid filter or an active carbon filter to form aerobic organism layers in a filtering sand layer or an active carbon layer. Since many aerobic and facultative anaerobic denitriding bacteria are contained in the aerobic organism layer, BOD and nitrification and denitrification of nitride components can be efficiently progressed while the water is made to flow through the filtering sand and the active carbon filter.

BRIEF DESCRIPTION OF DRAWINGS

FIGS. 3 and 4 are diagrams showing dissolved oxygen concentrations in the system of the present invention and in a conventional system, respectively.

BEST MODE FOR CARRYING OUT THE INVENTION

A polluted water purification apparatus using the vapor/liquid mixer according to an embodiment of the present invention will be described in detail with reference to a general view shown in FIG. 1.

Figure 1:
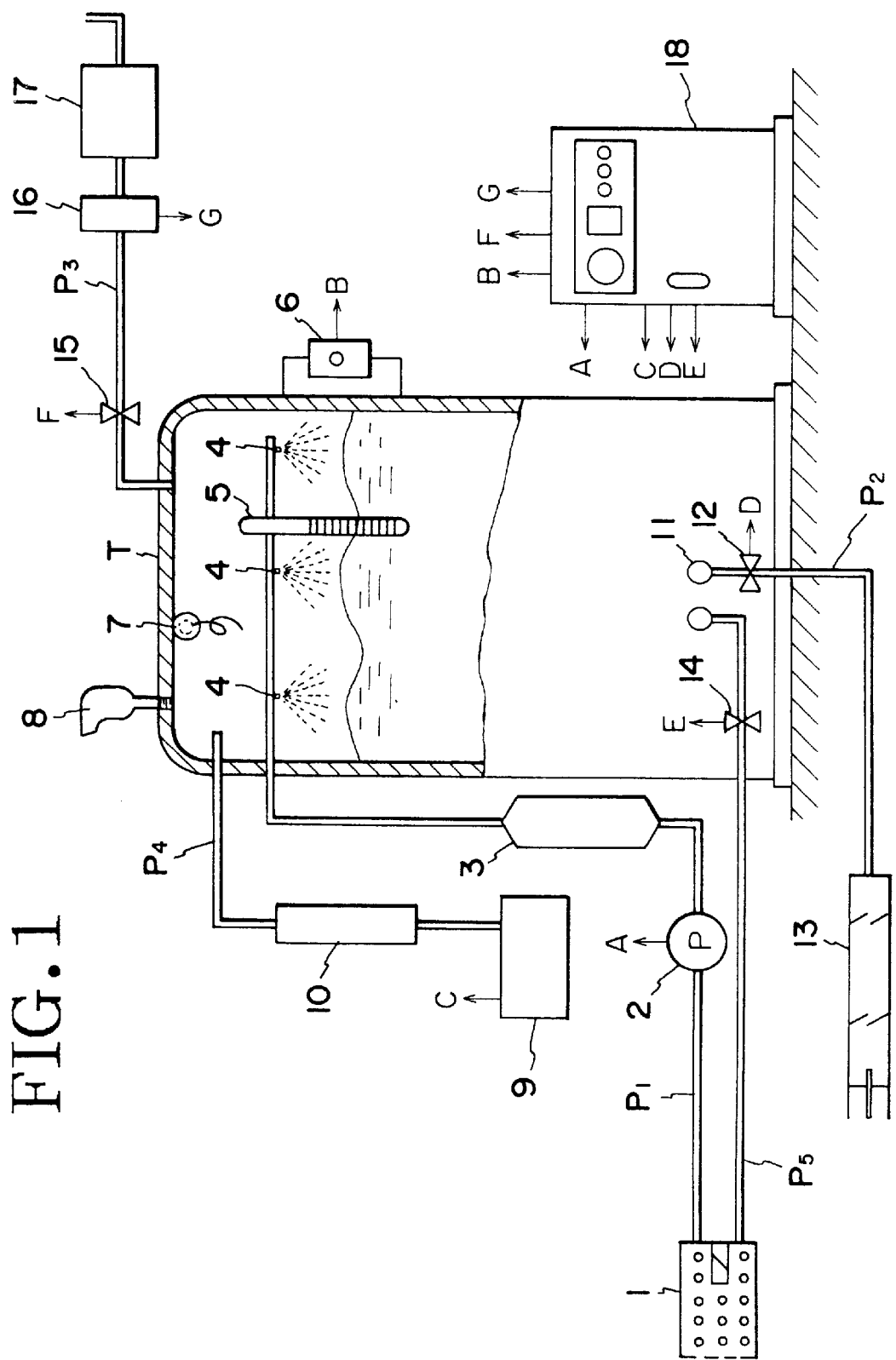
FIG. 1 is a general view of a polluted water purification apparatus according to an embodiment of the present invention.

The purification apparatus as shown in FIG. 1 includes a raw water suction strainer 1 which is inserted into polluted water, a pressure pump 2 which is connected to the strainer 1, and a raw water activator 3 which is placed in the downstream region of the pressure pump 2. The strainer 1, pressure pump 2, and raw water activator 3 are connected by a pipe $P_1$, and an end of the pipe $P_1$ is connected to a pressure tank T.

The raw water activator 3 imparts magnetism to the polluted water to break up clusters of the polluted water pumped up by the pressure pump 2, and the treated polluted water is then supplied to the pressure tank T.

The pressure tank T stores the polluted water containing dissolved oxygen and further dissolve oxygen in the polluted water therein. That is, the pressure tank T functions both as a conventional pressure tank and as a conventional ejector. The pressure tank T may be made of iron or stainless steel and should have a structure which can withstand exposure to pressures of 10 kgf/cm$^2$ or more.

To the pressure tank T, the pipe $P_1$ as an inlet is connected as described above, and a pipe $P_2$ as an outlet, a pipe $P_3$ for degasification on a top of the tank, and a pipe $P_4$ for supplying air on a side of the tank are connected, respectively.

An end of a high-pressure shower nozzle 4 is connected to the pipe $P_1$. From ejecting ports of the nozzle 4, the polluted water of a high pressure of about 5 kgf/cm$^2$ is ejected as a shower onto the water level of the pressure tank T so as to collide with the water level. This configuration can exhibit the so-called Lenard effect, that is, when water violently collides with rock or the like in waterfalls or rapid rivers, large amounts of negative ions are formed, and clean air containing fine mists is generated. The high-pressure shower nozzle 4 allows the water in the pressure tank T to form a vortex.

A water level gauge 5 detects the water level in the pressure tank T, and a switch 6 controls the water level in the tank T based on measurements obtained by the water level gauge 5. The switch 6 is connected to a pressure compressor 9 through a control unit 18 as stated below and controls the water level in the pressure tank T to an appropriate level. The appropriate water level is a level at which the volume of air in the upper region of the tank T occupies 30% or more of the total capacity of the tank. In the present embodiment, the volume of air is controlled to adjust the water level to such appropriate level.

A pressure gauge 7 determines the pressure inside the pressure tank T to control the pressure compressor 9 described below, thereby adjusting the pressure in the pressure tank T to a range from 3 to 5 kgf/cm$^2$.

A relief valve 8 is arranged on the top of the pressure tank T. Upon pressure anomalies, the valve opens to allow the inside gas escape to the outside air, thereby preventing the damage of the pressure tank T.

To the air supplying pipe $P_4$, the pressure compressor 9 and an excited oxygen generator tank 10 are connected in this order. By starting these units, high-pressure air having a high oxygen concentration is supplied from the pipe $P_4$ to the pressure tank T. The pressure compressor 9 is interlocked with the water level gauge 5 and the switch 6 and is automatically turned on/off according to volume of the water or changes in the pressure of the pressure tank T.

The pipe $P_2$ is connected to an outlet 11 of the pressure tank T, and a throttle valve 12 is provided in the pipe $P_2$ and a discharge nozzle 13 at the end. By opening the throttle valve 12, water having a pressure from 3 to 5 kgf/cm$^2$ and containing dissolved oxygen is discharged into the polluted water, and the compressed oxygen dissolved in the discharged water is released to expand, thereby forming fine air bubbles. The fine air bubbles of oxygen oxidize and decompose toxic substances in the polluted water.

A pipe $P_5$ for back washing is connected to the bottom of the pressure tank T, and a tip of the pipe $P_5$ is connected to the raw water suction strainer 1. A throttle valve 14 is arranged in the pipe $P_5$. By opening the throttle valve 14, pressurized water in the pressure tank T washes back the raw water suction strainer 1 to prevent plugging of the strainer 1.

A throttle valve 15 arranged in the degasification pipe $P_3$ opens when the gas concentration in the tank T reaches or exceeds a predetermined level, and discharges gas in the pressure tank T to the outside. On the downstream side of the throttle valve 15, an air filter 16 for removed gas to eliminate toxic substances and a deodorizer 17 are arranged. By this configuration, toxic substances and odors in the removed gas are eliminated, and the treated gas is discharged into the outside air.

The control unit 18 is connected to and controls the pressure pump 2, switch 6, pressure compressor 9, throttle valves 12, 14 and 15, air filter 16, and other members as indicated by arrows A to G in the figure.

The polluted water purification apparatus according to the present embodiment includes a high-pressure shower nozzle to eject the polluted water onto the water level of the pressure tank T and therefore can allow oxygen to efficiently dissolve in the polluted water. Accordingly, with a relatively simple structure, a satisfactory purification capacity can be obtained.

Figure 2:
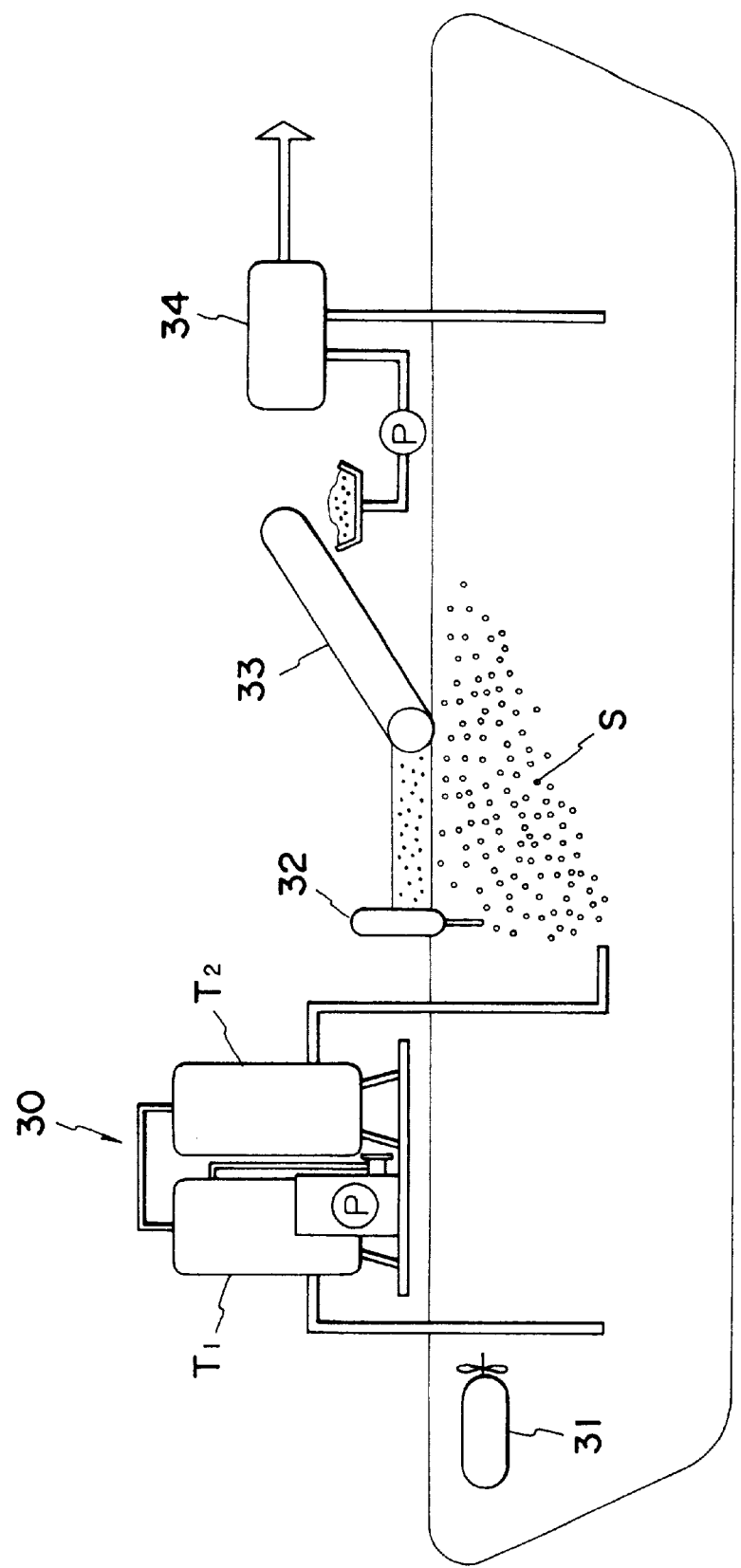
FIG. 2 is a general view of a polluted water purification apparatus according to another embodiment of the present invention.

FIG. 2 is a diagram showing another embodiment of the present invention, in which the invention is applied to ponds, lakes or marshes. The polluted water purification apparatus of the present embodiment operates according to the same principle as in the apparatus shown in FIG. 1, except that two pressure tanks $T_1$ and $T_2$ are arranged in series.

The system shown in FIG. 2 includes a polluted water purification apparatus 30, an ejector pump 31, an oil fence 32, a belt conveyer 33, and a dewatering apparatus 34. In the purification according to this system, polluted water in a pond is taken into the polluted water purification apparatus 30. In the apparatus, oxygen is dissolved under pressure as described in the previous embodiment, and the treated water is discharged into the pond. The dissolved oxygen is converted into fine air bubbles in this process. The fine bubbles S purify the pond, and a portion of pollutants rises as scum. The risen scum is collected within a predetermined region by the oil fence 32 and is gathered by the belt conveyer 33. The gathered scum is dewatered by the dewatering apparatus 34 and is transported to the outside by, for example, a truck.

To verify advantages of the present invention, oxygen absorption efficiency and other values were determined using the embodiment shown in FIG. 1, a system applying a shower and water turbine as Comparative Example 1, a system applying a tubular air diffuser as Comparative Example 2, and a system applying an ejector as Comparative Example 3. The oxygen absorption efficiency was determined by evaluating oxidation of an $Na_2SO_3$ solution.

EXAMPLE

In the apparatus of the present invention, the instantaneous mixing rate of the dissolved oxygen almost reached saturation (at 20° C., 8.84 ppm Max) at a water volume of 0.4 m$^3$, a supplied air volume of 10 liter/min, a discharge rate of 3 M$^3$/Hr, and a power of 0.6 kw. The oxygen absorption efficiency of this apparatus was 23.9%.

COMPARATIVE EXAMPLE 1

The system using a shower and water turbine has been employed, for example, in cultivation. The oxygen absorption efficiency of this system was 0.15% at a water volume of 0.4 M$^3$, a discharge rate of 3 M$^3$/Hr, and a power of 0.1 kw.

COMPARATIVE EXAMPLE 2

The system using a tubular air diffuser had oxygen absorption efficiency of 0.17% at a water volume of 0.4 m³, a supplied air volume of 10 liter/min, and a power of 0.6 kw. According to this system, the efficiency was particularly low in the case of running water having a depth of about 1 m. The tubular air diffusers were arrayed in a river over a range of 100 m, and air was supplied to the tubular air diffusers for a DO increase test. As a result, the DOs of water before and after passing through the test system were both 0.5 ppm, indicating that no change have occurred.

COMPARATIVE EXAMPLE 3

Although the oxygen absorption efficiency of the system using an ejector was the best result among the conventional aeration systems, the efficiency was 3% at a water volume of 0.4 m³, a supplied air volume of 10 liter/min, a discharge rate of 3 m³/Hr, and a power of 0.6 kw. In addition, the reaction discontinued during the test before a final reaction. This is probably because $Na_2SO_3$ started an oxidation reaction at an early stage by rapidly mixing air into water when dissolved oxygen was not present, but the reaction probability with oxygen decreased with a decreasing concentration of $Na_2SO_3$.

As stated above, the apparatus of the present invention can exhibit a performance (oxygen absorption efficiency) which is 8 to 100 times greater than those in the conventional systems (systems using a shower and water turbine, a tubular air diffuser, or an ejector).

As shown in FIG. 3, powers required to increase DO by 1 ppm were determined using fresh water of which dissolved oxygen had been biologically reduced to zero. As a result, a blower of 0.59 kw required a power of 0.9 KW/ppm while the apparatus of the present invention required a power of 0.3 KW/ppm, which was about 60% of that required by the blower.

FIG. 4 is a comparative diagram showing DO increase in the apparatus of the present invention and in a tubular air diffuser with the abscissa showing the time and the ordinate showing the dissolved oxygen concentration. In this test, also determined were changes in dissolved oxygen concentration after the operation of the apparatus was discontinued after supplying oxygen in a predetermined time. Test conditions are shown at the lower right of the figure.

As apparent from FIG. 4, according to the apparatus of the present invention, the DO rapidly reached the saturation point in a short time (15 min.) and was stable at the saturation point even after the operation of the apparatus had been discontinued. In contrast, in the system using the tubular air diffuser, the rise of the dissolved oxygen concentration was slow and did not reach the saturation point. In addition, after discontinuing the operation, the dissolved oxygen concentration dropped to 4 ppm and remained the same, which was half the concentration at the time when the operation had been discontinued: 8 ppm. The above test results are attributable to the diameter of air bubbles obtained in the apparatus of the present invention, that is 5 μm and smaller than those obtained in conventional systems, and also to the uniformity of the air bubbles.

The present invention has the following advantages.

(1) Providing a liquid ejecting means which ejects a liquid onto a liquid level of a pressure tank enables gas to efficiently dissolve in a liquid. Accordingly, a vapor/liquid mixer which has a relatively simple structure and is capable of allowing fine air bubbles with a satisfactory purification capacity to dissolve in the liquid can be obtained (2) By ejecting a liquid as a shower, gas is allowed to dissolve in a surface region of the liquid more efficiently.

(3) The polluted water purification apparatus of the present invention includes a gas supplying means which supplies gas such as oxygen to the pressure tank, a water level control means which controls the water level in the pressure tank, a polluted water ejecting means which ejects polluted water pumped up onto the water level of the pressure tank, and a discharging means which discharges the water in the pressure tank into the polluted water region. By this configuration, the apparatus can markedly increase purification efficiency of the polluted water with a relatively simple structure requiring no ejector.

(4) By providing a degasifier which degasses the pressure tank and a deodorizer which deodorizes exhausted gas, the exhausted gas containing toxic substances can be treated to be safe and nontoxic.

INDUSTRIAL APPLICABILITY

As described above, the vapor/liquid mixer of the present invention can be used as a vapor/liquid mixer according to a pressure floating method in which gas such as oxygen is dissolved in polluted water to make pollutants rise. The vapor/liquid mixer can also be used in a polluted water purification apparatus, a deodorizer, a degasifier and others.

What is claimed is:

1. A polluted water purification apparatus which pumps up water in a polluted water region, dissolves a gas in the water under pressure, and discharges the water to the polluted water region again, wherein said apparatus comprises a pump which pumps up the polluted water in said polluted water region, a pressure tank in which the polluted water pumped up by the pump is stored, a gas supplying means which supplies said gas to the pressure tank, a water level control means which controls a water level in the pressure tank, a polluted water ejecting means which ejects the polluted water pumped up onto the water level of the pressure tank, a degasifier adapted to prevent toxic gaseous substances which accumulate in an upper portion of the pressure tank from re-polluting the water therein by discharging gas in said pressure tank when a concentration of gas in the pressure tank reaches or exceeds a predetermined level, and a discharging means which discharges the water in the pressure tank to the polluted water region.

2. A polluted water purification apparatus according to claim 1, wherein said polluted water ejecting means ejects the polluted water pumped up onto the water level of the pressure tank in a form of a shower.

3. A polluted water purification apparatus according to claim 1 or 2, further comprising a deodorizer which deodorizes discharged gas.

4. A polluted water purification apparatus according to claim 1, wherein said gas supplying means supplies oxygen to the pressure tank.

5. A polluted water purification apparatus according to claim 1, wherein said gas supplying means supplies air to the pressure tank.

6. A polluted water purification apparatus according to claim 1, wherein said gas supplying means supplies a gas selected from the group consisting of air, oxygen, carbon dioxide and nitrogen to the pressure tank.

7. A polluted water purification apparatus according to claim 1, wherein said toxic gaseous substances comprise ammonia.

* * * * *